Jan. 8, 1924.
F. W. FELLOWS
SOLAR COMPASS
Filed Feb. 9, 1922
1,480,055
3 Sheets-Sheet 1
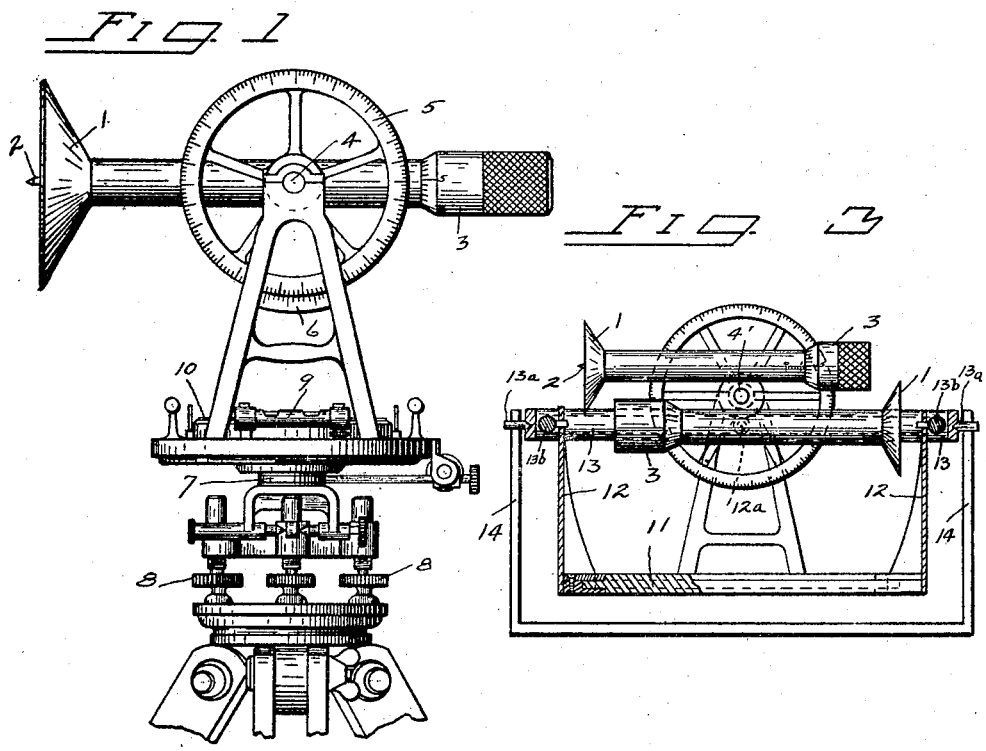
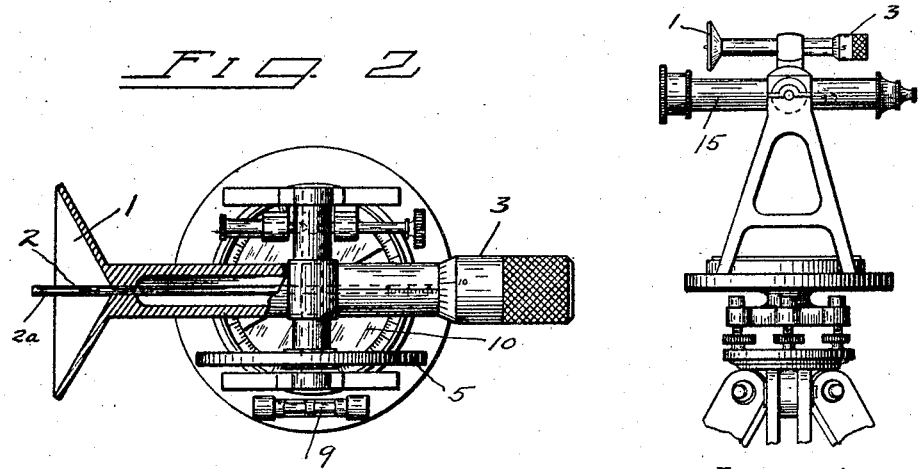
Inventor.
Frederick W. Fellows.
By [signature]
His Attorney.

Jan. 8, 1924.　　　　　　　　　　　　　　　　　1,480,055
F. W. FELLOWS
SOLAR COMPASS
Filed Feb. 9, 1922　　　3 Sheets-Sheet 2

Inventor.
Frederick W. Fellows.
By [signature]
His Attorney.

Jan. 8, 1924.  1,480,055
F. W. FELLOWS
SOLAR COMPASS
Filed Feb. 9, 1922  3 Sheets-Sheet 3

Inventor.
Frederick W. Fellows.
By
His Attorney.

Patented Jan. 8, 1924.

1,480,055

UNITED STATES PATENT OFFICE.

FREDERICK W. FELLOWS, OF LOS ANGELES, CALIFORNIA.

SOLAR COMPASS.

Application filed February 9, 1922. Serial No. 535,377.

*To all whom it may concern:*

Be it known that I, FREDERICK W. FELLOWS, a citizen of the United States, residing in the city of Los Angeles, county of Los Angeles, and State of California, have invented certain new and useful Improvements in Solar Compasses, of which the following is a specification.

My invention has for its principal object to provide an instrument with which, in connection with the sun, it is possible to determine, with reasonable accuracy, at any place upon the surface of the earth, the direction of the elevated pole of the celestial sphere, or, in other words, to determine the direction of the meridian, or a true north and south line.

With knowledge of the latitude at which the observer is located, and with the use of the Nautical Almanac to determine the angle of the sun's declination north or south of the celestial equator at the time the observation is taken, my improved instrument will enable the observer very quickly and in a very simple manner to determine the direction of the elevated pole of the celestial sphere, that is, the north pole if he be north of the equator, or the south pole if he be south of the equator.

It is known that north of the Tropic of Cancer the altitude of the sun as it crosses the meridian each day for the period of one year is greatest at the time of the summer solstice, and least at the time of the winter solstice, and exactly intermediate between these two extremes at the time of the vernal and autumnal equinoxes. This intermediate point marks the intersection of the celestial equator with the meridian, and, in all latitudes north of the equator, lies south of the zenith an angular distance equal to the latitude of the observer. In latitudes south of the Tropic of Capricorn the same annual change in the meridional altitude of the sun is observed, but with the seasons exactly reversed. As in northern latitudes, however, at all places in south latitudes, the intermediate point marks the intersection of the celestial equator with the meridian, and lies north of the zenith an angular distance equal to the latitude of the observer.

The sun travels across the sky each day in a path parallel to the celestial equator, save for the slow change due to its motion in declination. A line drawn from the sun to the observer will describe a cone the curved face of which lies throughout its diurnal course at a constant angle with the plane of the celestial equator, save for the slight change due to the said motion in declination. See Fig. 7, in which O is the position of the observer; MEK indicates the celestial equator; ABCD indicates a daily path of the sun when north of the equator; FGH indicates a daily path of the sun when south of the equator; and NES indicates the observer's horizon.

By bringing into coincidence with the plane of the celestial equator a circular edge capable of casting a shadow, the sun in a day's course will shine into, across, or over this circle at the same angle all day long, depending upon the angle of the sun's declination with reference to the celestial equator, and will cast a shadow at a constant angle to the plane of the circle's edge throughout the day. This angle will remain constant only so long as the circle is in the plane of the celestial equator, or, in other words, so long as a line passing through the center of the circle and lying perpendicular to its plane, passes through the poles of the celestial sphere. My invention provides such a shadow-casting circle with means for measuring this angle of the sun's shadow cast thereby.

My invention in one of its simplest forms, therefore, comprises a cup-like body with a stylus or reading element adjustably mounted therein, with means for adjusting it longitudinally to position a reading line thereon above or below the plane of the open edge of said cup, or shadow-casting element, whereby a shadow cast by the sun over the edge of said cup will strike said stylus at a point above or below the plane of the edge of the cup.

The instrument is mounted so as to be adjusted about a vertical axis and also about a horizontal axis. In some cases it can be mounted on gimbals, as is a ship's compass, for use at sea, and it can also be mounted on and used in connection with a surveyor's transit.

In order to fully explain my invention, I have illustrated it on the accompanying three sheets of drawings, which I will now describe.

Figure 1 is a side elevation of one embodiment of my invention, mounted on a surveyor's transit, in place of the telescope thereof;

Figure 2 is a top plan view thereof;

Figure 3 is a view showing it mounted on gimbals, for use at sea;

Figure 4 is a view showing my instrument mounted on the telescope of a transit;

Figure 6:
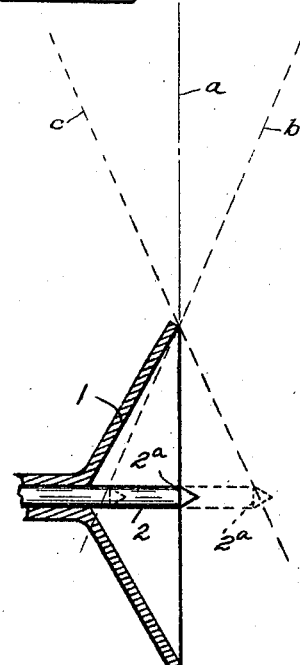
Figure 6 is a fragmentary, sectional view of the functioning parts of my invention.

Referring first to Fig. 6, I will describe the functioning parts of one embodiment of my invention and later will describe the different supports or mountings therefor, whereby the adjustments can be made. The body 1, is a cup-like member, here shown to be of conical form, with a stylus, or pin 2, mounted therein. This reading element 2 is provided with a reading mark or ring, 2ª, or it can be pointed, as shown in Figs. 1 and 6, with the reading mark at the shoulder. The stylus is adjustable by means of a micrometer adjustment to position the reading mark 2ª either in the plane of the edge of the cup, as indicated in Fig. 6 by the full line, a, or toward the bottom of the cup, as indicated by the broken line b, or beyond the plane of the edge of the cup, as indicated by the broken line c, and at all intermediate points. These lines also represent the sun's rays over the edge of the cup, which edge is preferably sharp, so that a shadow from the edge of the cup striking the stylus in the manner indicated by the lines from the three different positions of the sun, will be sufficiently sharp and clear to be readily read.

Figure 7:
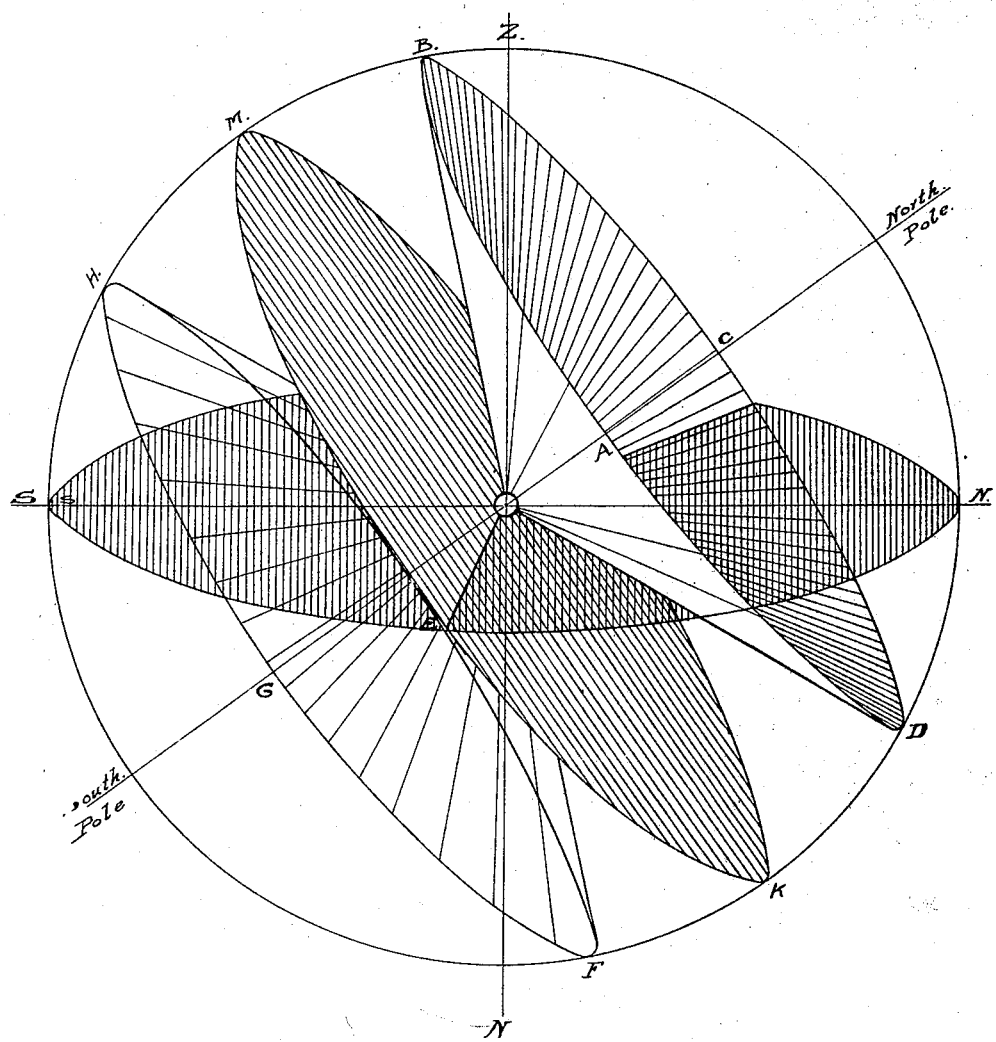
Figure 7 is a diagrammatic view illustrating the extreme north and south declinations of the sun and the intermediate plane, or celestial equator.

It will be seen that if the cup be tilted exactly toward the north so that the plane of the edge of the cup will be coincident with the plane of the celestial equator, MEK, Fig. 7, the stylus will point toward the elevated pole of the heavens, and the sun, if north of the plane of the celestial equator, will shine into the cup all day long at the same angle, while traveling around approximately half of the circumference of the cup during the course of the day, and the stylus will be cut by the shadow of the edge of the cup at the same height all day long. This is only modified by the slight diurnal change in the sun's declination, the sun really describing a spiral of slight and ever changing pitch, instead of a true circle in its daily path through the heavens. If the sun is south of the plane of the celestial equator, the shadow of the edge of the cup will not fall into the cup, but will cut the stylus all day long at approximately the same height above the plane of the edge of the cup as indicated by the broken line c, Fig. 6, that is, from the extreme position. When the sun is on the celestial equator, the shadow will cut the stylus in the plane of the edge of the cup.

The angle of the sun's declination north or south of the celestial equator can be calculated for any instant of time from the Nautical Almanac, published three years in advance. This is familiar to all navigators and surveyors.

The shadow of the edge of the cup will fall on the stylus at, above or below, the plane of the edge of the cup (which lies in the plane of the celestial equator), a distance equal to the tangent of the declination of the sun at the time of the reading, using the distance of the stylus from the edge of the cup as unity. The sun's declination is calculated before hand, and the point where the shadow will fall on the stylus can be determined by multiplying the distance from the edge of the bowl or cup to the stylus by the tangent of the sun's declination and measuring this distance up or down upon the stylus from the plane of the edge of the cup. If the cup be rotated about a vertical axis, so that the stylus no longer points to the north, the shadow will no longer coincide with the calculated place, but will move up or down the stylus therefrom.

If the stylus be movable longitudinally, and a mark 2ª be made around the stylus, as indicated, the stylus can be adjusted longitudinally before hand so that this mark or reading point will be positioned at the place where the shadow will become tangent to it, if the stylus point to the elevated pole.

The adjustment of the stylus is made by the use of the well known micrometer mechanism, indicated at 3, on the drawings, and need not be described in detail. This micrometer indicates the distance of the reading line on the stylus on either side of the plane of the effective edge of the cup. The micrometer will, for example, show zero when the reading line on the stylus occupies the plane of the shadow-casting edge of the body 1, and the distances in either direction are easily measured, and the stylus can be easily adjusted.

From the foregoing, it will be understood that the operator sets the instrument at the angle of the latitude of his position on the earth, that is, so that the plane of the cup's edge will be at the same angle from the vertical as his angular distance from the earth's equator. He has calculated the declination of the sun from the Nautical Almanac at the time of the observation. He now adjusts the stylus by means of the micrometer so that the reading point on the stylus will be as far above or below the plane of the edge of the cup as the tangent of the angle of the sun's declination, using the distance from the edge of the cup to the stylus as unity. Having made these adjustments it only remains to rotate the instrument about its vertical axis until the shadow cast from the edge of the cup cuts the stylus at the reading point, or, in other words, is tangent to the reading mark on the stylus. The stylus now points to the elevated pole of the heavens, and hence lies in the meridian.

I will now describe the mountings for my instrument, and how it may be set up for use. Referring to Fig. 1, it will be recognized that the instrument proper is mounted on the usual surveyor's transit, to turn about a horizontal axis, 4, with a graduated wheel, 5, moving in relation to a short graduated segment, 6, for adjustment of the instrument in a manner which is clear from this showing. In addition to turning about the horizontal axis, 4, said instrument can be turned about a vertical axis, as at 7, and also that the instrument can be adjusted to a level position by means of the usual adjustment nuts, 8, 8, with the spirit level 9, to indicate when level. There is also a compass, 10, Fig. 2, which may be used to indicate the difference between the magnetic north pole and the pole of the celestial sphere.

Referring to Fig. 3, I have shown the instrument mounted on gimbals for use at sea, or where it is carried on a moving body. In order to maintain a balanced instrument, on its horizontal axis, 4', I have shown two instruments mounted, one above and one below said axis, said instruments being reversed end for end so that when one instrument is adjusted by the micrometer, 3, to change the position of the stylus, 2, the other can be correspondingly adjusted and thus maintain the balance. The instruments are mounted upon a platform turn-table, 11, suspended in a frame 12, which is supported in a ring member 13, pivotally supported in a supporting frame 14. The supporting frame 12 swings on supporting pivot points, 12ª, between the two rings, 13 and 13ᵇ, while the outer ring 13 swings on the pivots 13ª, 13ª, in the frame 14. Thus the instrument will maintain a true horizontal position, and can be adjusted about a vertical axis and about a horizontal axis, and by adjusting both instruments, they can be kept in balance about the horizontal axis.

In Fig. 4, I have shown the instrument mounted upon the telescope 15, of a surveyor's transit, whereby it can be used in connection therewith, when necessary or advantageous.

Figure 5:
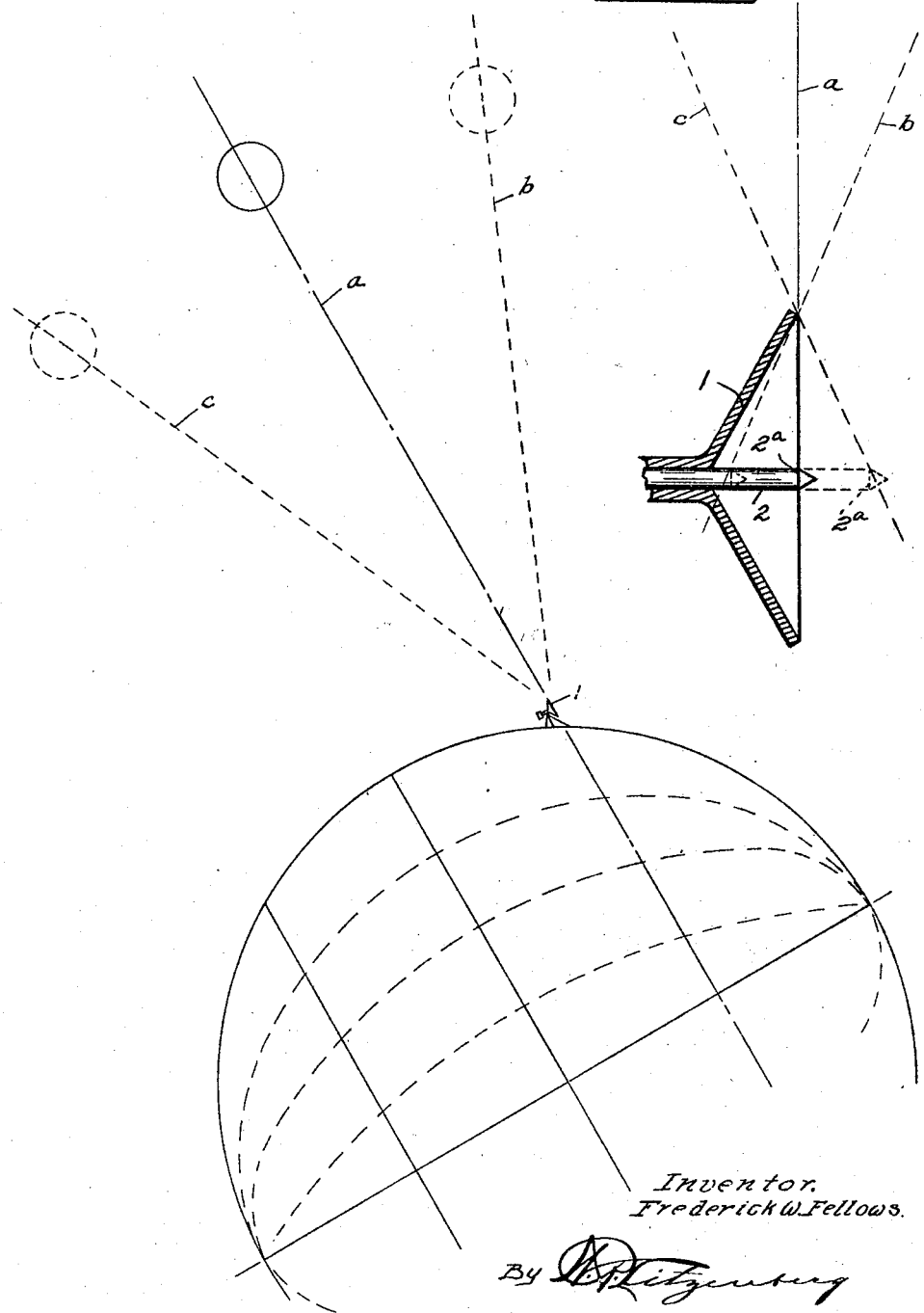
Figure 5 is a diagrammatic view showing my invention in use, being greatly exaggerated in relation to the earth and the sun.

In Fig. 5, the relative positions of the instrument, the earth and the sun are indicated, as has been referred to in the first part of this specification.

I do not limit my invention to the specific forms or embodiments thereof here shown for illustrative purposes, realizing that it can be embodied in many different forms and mounted in various ways, as conditions may require, but what I claim and desire to secure by Letters Patent is:

1. A solar compass comprising an element having a circular shadow-casting edge and a reading element adapted to receive the shadow cast by the sun's rays across said edge, said reading element being co-axial with said edge.

2. A solar compass comprising an element having a circular shadow-casting edge and a centrally disposed reading element adapted to receive the shadow cast by the sun's rays across said edge, said reading element extending through the plane of said edge whereby to receive the shadow cast at either side of the plane of the edge of the shadow-casting element.

3. A solar compass comprising in combination an element having a circular shadow-casting edge, and a reading element centrally located and adjustable longitudinally through the plane of said edge.

4. A solar compass comprising in combination an element having a circular shadow-casting edge, a reading element centrally located and adjustable longitudinally through the plane of said edge, and means for accurately adjusting said reading element.

5. A solar compass comprising an element having a circular shadow-casting edge, a centrally disposed reading stylus, and a micrometer mechanism for adjusting said stylus longitudinally of the axis of said edge.

6. A solar compass comprising an element having a circular shadow-casting edge, a reading element adapted to receive the shadow cast by the sun's rays across said edge, and means supporting said compass for adjustment about a horizontal axis to position said shadow-casting element to different angles.

7. A solar compass comprising an element having a circular shadow-casting edge, a reading element adapted to receive the shadow cast by the sun's rays across the edge of said element, and means supporting said compass, said means being adapted for adjustment of said compass about a vertical axis and about a horizontal axis, whereby to position said element in different angular positions.

8. A solar compass comprising a shadow-casting element, a reading stylus adjustably mounted therein and adjustable longitudinally through the plane of the edge of said shadow-casting element, and supporting means for said compass adapted to permit its being tilted to different positions.

9. A solar compass comprising a shadow-casting element, a reading stylus adjustably mounted therein and adjustable longitudinally of the axis of said shadow-casting element to receive the shadow cast by the sun's rays across the edge of said shadow-casting element, means for adjusting said reading stylus accurately, and supporting means for said compass adapted to be adjusted about a horizontal axis and about a vertical axis.

10. A solar compass comprising an element having a shadow-casting edge, a reading stylus centrally disposed and adjustable longitudinally through the plane of said edge, means for adjusting the same, and means for adjustably supporting said compass for adjustment universally, for the purpose described.

11. A solar compass comprising a cup-like element having a shadow-casting edge, a reading stylus mounted centrally therein and adjustable axially thereof, and means for adjusting said stylus.

12. A solar compass comprising a cup-like element having a shadow-casting edge, a reading stylus mounted centrally therein and adjustable axially, means for adjusting the same axially, and means supporting said compass for bodily adjustment about horizontal and vertical axes, substantially as described.

13. A solar compass of the character referred to comprising a body having a conical cup-like portion, a reading stylus mounted centrally therein and adjustable longitudinally, and micrometer mechanism for adjusting said stylus relative to the plane of the edge of said conical cup-like portion, substantially as described.

14. A solar compass of the character referred to comprising a body having a cup-like portion provided with a circular shadow-casting edge, a centrally disposed reading stylus adjustable axially of said body and said cup-like portion, means for adjusting the same, a support for said compass adapted for adjustment about a horizontal axis, and means for maintaining a balance thereof on said horizontal axis.

15. A solar compass of the character referred to comprising in combination an element having a circular shadow-casting edge, a reading stylus therein adapted to receive a shadow cast by the sun's rays over said edge, and means for adjustment of said elements relative to each other.

16. A solar compass of the character referred to comprising in combination an element having a circular shadow-casting edge, a reading element centrally located therein and adapted to be struck by a shadow of said edge, and means for adjustment of said elements relative to each other axially.

Signed at Los Angeles, county of Los Angeles, California, this 31st day of January, 1922.

FREDERICK W. FELLOWS.

Witnesses:
W. R. LITZENBERG,
C. M. SOUTHARD.